(12) United States Patent
Ohta et al.

(10) Patent No.: US 11,032,738 B2
(45) Date of Patent: *Jun. 8, 2021

(54) BASE STATION DEVICE, TERMINAL DEVICE, COMMUNICATION METHOD AND COMMUNICATION SYSTEM

(71) Applicant: FUJITSU LIMITED, Kawasaki (JP)

(72) Inventors: Yoshiaki Ohta, Yokohama (JP);
Takayoshi Ode, Yokohama (JP);
Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,379

(22) Filed: Jul. 2, 2019

(65) Prior Publication Data

US 2019/0327640 A1 Oct. 24, 2019

Related U.S. Application Data

(63) Continuation of application No. 16/260,672, filed on Jan. 29, 2019, now Pat. No. 10,397,828, which is a continuation of application No. PCT/JP2018/014339, filed on Apr. 3, 2018.

(51) Int. Cl.
*H04W 28/06* (2009.01)
*H04W 88/08* (2009.01)
*H04W 80/02* (2009.01)

(52) U.S. Cl.
CPC .......... *H04W 28/06* (2013.01); *H04W 80/02* (2013.01); *H04W 88/08* (2013.01)

(58) Field of Classification Search
CPC ...... H04W 28/06; H04W 80/02; H04W 88/08
See application file for complete search history.

(56) References Cited

U.S. PATENT DOCUMENTS

| | | |
|---|---|---|
| 2002/0090033 A1 | 7/2002 | Anderlind et al. |
| 2003/0007512 A1 | 1/2003 | Tourunen et al. |
| 2005/0238016 A1 | 10/2005 | Nishibayashi et al. |
| 2006/0050709 A1 | 3/2006 | Sung et al. |

(Continued)

FOREIGN PATENT DOCUMENTS

| | | |
|---|---|---|
| JP | 2004-533792 A | 11/2004 |
| JP | 2007-89107 A | 4/2007 |

(Continued)

OTHER PUBLICATIONS

R2-1705680—Samsung NR MAC header fields. 3GPP TSG-RAN WG2 Meeting #98—May 19, 2017.*

(Continued)

*Primary Examiner* — Stephen J Clawson
(74) *Attorney, Agent, or Firm* — Myers Wolin, LLC

(57) ABSTRACT

A base station device including: a transmitter configured to transmit, for each logical channel, first data of a first type and second data of a second type; and processor circuitry configured to: omit information about a data length of the second data in a MAC protocol data unit (PDU), place a medium access control (MAC) header in front of a MAC service data unit (MSDU) of the second data, and multiplex the first data and the second data, wherein the data length of the second data is omitted from the MAC header and an R bit (reserved bit) is set in the first bit of the first octet in the MAC header.

13 Claims, 19 Drawing Sheets

(56) References Cited

U.S. PATENT DOCUMENTS

| | | | | |
|---|---|---|---|---|
| 2012/0014366 | A1* | 1/2012 | Kim | H04W 28/065 370/338 |
| 2017/0318606 | A1 | 11/2017 | Lee et al. | |
| 2018/0035416 | A1 | 2/2018 | Yi et al. | |

FOREIGN PATENT DOCUMENTS

| | | |
|---|---|---|
| JP | 2017-200185 A | 11/2017 |
| JP | 2018-26705 A | 2/2018 |
| WO | 2018/049113 A1 | 3/2018 |

OTHER PUBLICATIONS

International Search Report with Written Opinion of the International Searching Authority issued by the Japan Patent Office for corresponding International Patent Application No. PCT/JP2018/014339, dated May 15, 2018, with an English translation.

Non-Final Office Action issued for corresponding U.S. Appl. No. 16/260,672 dated May 6, 2019 by the United States Patent & Trademark Office, electronically delivered on May 6, 2019.

Notice of Allowance issued for corresponding U.S. Appl. No. 16/260,672 dated Jun. 21, 2019 by the United States Patent & Trademark Office, electronically delivered on Jun. 21, 2019.

3GPP TS 36.211 V15.0.0, "3rd Generation Partnership Project; Technical Specification Group Radio Access Network; Evolved Universal Terrestrial Radio Access (E-UTRA); Physical channels and modulation (Release 15)", Dec. 2017.

3GPP TS 36.212 V15.0.1, "3rd Generation Partnership Project; Technical Specification Group Radio Access Network; Evolved Universal Terrestrial Radio Access (E-UTRA); Multiplexing and channel coding (Release 15)", Jan. 2018.

3GPP TS 36.213 V15.0.0, "3rd Generation Partnership Project; Technical Specification Group Radio Access Network; Evolved Universal Terrestrial Radio Access (E-UTRA); Physical layer procedures (Release 15)", Dec. 2017.

3GPP TS 36.300 V15.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Dec. 2017.

3GPP TS 36.321 V15.0.0, "3rd Generation Partnership Project; Technical Specification Group Radio Access Network; Evolved Universal Terrestrial Radio Access (E-UTRA); Medium Access Control (MAC) protocol specification (Release 15)", Dec. 2017.

3GPP TS 36.322 V15.0.0, "3rd Generation Partnership Project; Technical Specification Group Radio Access Network; Evolved Universal Terrestrial Radio Access (E-UTRA); Radio Link Control (RLC) protocol specification (Release 15)", Dec. 2017.

3GPP TS 36.323 V14.5.0, "3rd Generation Partnership Project; Technical Specification Group Radio Access Network; Evolved Universal Terrestrial Radio Access (E-UTRA); Packet Data Convergence Protocol (PDCP) specification (Release 14)", Dec. 2017.

3GPP TS 36.331 V15.0.1, "3rd Generation Partnership Project; Technical Specification Group Radio Access Network; Evolved Universal Terrestrial Radio Access (E-UTRA); Radio Resource Control (RRC); Protocol specification (Release 15)", Jan. 2018.

3GPP TS 36.413 V15.0.0, "3rd Generation Partnership Project; Technical Specification Group Radio Access Network; Evolved Universal Terrestrial Radio Access Network (E-UTRAN); S1 Application Protocol (S1AP) (Release 15)", Dec. 2017.

3GPP TS 36.423 V15.0.0, 3rd Generation Partnership Project; Technical Specification Group Radio Access Network; Evolved Universal Terrestrial Radio Access Network (E-UTRAN); X2 application protocol (X2AP) (Release 15), Dec. 2017.

3GPP TS 36.425 V14.0.0, "3rd Generation Partnership Project; Technical Specification Group Radio Access Network; Evolved Universal Terrestrial Radio Access Network (E-UTRAN); X2 interface user plane protocol (Release 14)", Mar. 2017.

3GPP TS 37.340 V15.0.0, "3rd Generation Partnership Project; Technical Specification Group Radio Access Network; Evolved Universal Terrestrial Radio Access (E-UTRA) and NR; Multi-connectivity; Stage 2 (Release 15)", Dec. 2017.

3GPP TS 38.201 V15.0.0, "3rd Generation Partnership Project; Technical Specification Group Radio Access Network; NR; Physical layer; General description (Release 15)", Dec. 2017.

3GPP TS 38.202 V15.0.0, "3rd Generation Partnership Project; Technical Specification Group Radio Access Network; NR; Services provided by the physical layer (Release 15)", Dec. 2017.

3GPP TS 38.211 V15.0.0, "3rd Generation Partnership Project; Technical Specification Group Radio Access Network; NR; Physical channels and modulation (Release 15)", Dec. 2017.

3GPP TS 38.212 V15.0.0, "3rd Generation Partnership Project; Technical Specification Group Radio Access Network; NR; Multiplexing and channel coding (Release 15)", Dec. 2017.

3GPP TS 38.213 V15.0.0, "3rd Generation Partnership Project; Technical Specification Group Radio Access Network; NR; Physical layer procedures for control (Release 15)", Dec. 2017.

3GPP TS 38.214 V15.0.0, "3rd Generation Partnership Project; Technical Specification Group Radio Access Network; NR; Physical layer procedures for data (Release 15)", Dec. 2017.

3GPP TS 38.215 V15.0.0, "3rd Generation Partnership Project; Technical Specification Group Radio Access Network; NR; Physical layer measurements (Release 15)", Dec. 2017.

3GPP TS 38.300 V15.0.0, "3rd Generation Partnership Project; Technical Specification Group Radio Access Network; NR; NR and NG-RAN Overall Description; Stage 2 (Release 15)", Dec. 2017.

3GPP TS 38.321 V15.0.0, "3rd Generation Partnership Project; Technical Specification Group Radio Access Network; NR; Medium Access Control (MAC) protocol specification (Release 15)", Dec. 2017.

3GPP TS 38.322 V15.0.0, "3rd Generation Partnership Project; Technical Specification Group Radio Access Network; NR; Radio Link Control (RLC) protocol specification (Release 15)", Dec. 2017.

3GPP TS 38.323 V15.0.0, "3rd Generation Partnership Project; Technical Specification Group Radio Access Network; NR; Packet Data Convergence Protocol (PDCP) specification (Release 15)", Dec. 2017.

3GPP TS 38.331 V15.0.0, "3rd Generation Partnership Project; Technical Specification Group Radio Access Network NR Radio Resource Control (RRC) protocol specification (Release 15)", Dec. 2017.

3GPP TS 38.401 V15.0.0, "3rd Generation Partnership Project; Technical Specification Group Radio Access Network; NG-RAN; Architecture description (Release 15)", Dec. 2017.

3GPP TS 38.410 V0.6.0, "3rd Generation Partnership Project; Technical Specification Group Radio Access Network; NG-RAN; NG general aspect and principles (Release 15)", Dec. 2017, clean version, with cover sheet and list of open issues.

3GPP TS 38.410 V0.6.0, "3rd Generation Partnership Project; Technical Specification Group Radio Access Network; NG-RAN; NG general aspect and principles (Release 15)", Dec. 2017, marked up version.

3GPP TS 38.413 V0.5.0, "3rd Generation Partnership Project; Technical Specification Group Radio Access Network; NG Radio Access Network (NG-RAN); NG Application Protocol (NGAP) (Release 15)", Dec. 2017, clean version, with cover sheet and list of open issues.

3GPP TS 38.413 V0.5.0, "3rd Generation Partnership Project; Technical Specification Group Radio Access Network; NG Radio Access Network (NG-RAN); NG Application Protocol (NGAP) (Release 15)", Dec. 2017, marked up version.

3GPP TS 38.420 V0.5.0, "3rd Generation Partnership Project; Technical Specification Group Radio Access Network; NG-RAN; Xn general aspects and principles (Release 15)", Dec. 2017, clean version, with cover sheet.

3GPP TS 38.420 V0.5.0, "3rd Generation Partnership Project; Technical Specification Group Radio Access Network; NG-RAN; Xn general aspects and principles (Release 15)", Dec. 2017, marked up version.

(56) References Cited

OTHER PUBLICATIONS

3GPP TS 38.423 V0.5.0, "3rd Generation Partnership Project; Technical Specification Group Radio Access Network; NG Radio Access Network (NG-RAN); Xn application protocol (XnAP) (Release 15)", Dec. 2017, clean version, with cover sheet.
3GPP TS 38.423 V0.5.0, "3rd Generation Partnership Project; Technical Specification Group Radio Access Network; NG Radio Access Network (NG-RAN); Xn application protocol (XnAP) (Release 15)", Dec. 2017, marked up version.
3GPP TS 38.470 V15.0.0, "3rd Generation Partnership Project; Technical Specification Group Radio Access Network; NG-RAN; F1 general aspects and principles (Release 15)", Jan. 2018.
3GPP TS 38.473 V15.0.0, "3rd Generation Partnership Project; Technical Specification Group Radio Access Network; NG-RAN; F1 application protocol (F1AP) (Release 15)", Dec. 2017.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V14.3.1, "3rd Generation Partnership Project; Technical Specification Group Radio Access Network; Study on channel model for frequency spectrum above 6 GHz (Release 14)", Jul. 2017.
3GPP TR 38.912 V14.1.0, "3rd Generation Partnership Project; Technical Specification Group Radio Access Network; Study on New Radio (NR) access technology (Release 14)", Jun. 2017.
3GPP TR 38.913 V14.3.0, "3rd Generation Partnership Project; Technical Specification Group Radio Access Network; Study on Scenarios and Requirements for Next Generation Access Technologies; (Release 14)", Jun. 2017.
NTT DOCOMO, "New SID Proposal: Study on New Radio Access Technology", Agenda Item: 9.1, 3GPP TSG-RAN Meeting #71, RP-160671, Goteborg, Sweden, Mar. 7-10, 2016.
NTT DOCOMO, Inc., "On co-existence of eMBB and URLLC", Agenda Item: 8.1.8, 3GPP TSG-RAN WG1 Meeting #86, R1-167391, Gothenburg, Sweden, Aug. 22-26, 2016.
3GPP TS 36.214 V15.2.0, "3rd Generation Partnership Project; Technical Specification Group Radio Access Network; Evolved Universal Terrestrial Radio Access (E-UTRA); Physical layer; Measurements (Release 15)", Jun. 2018.
3GPP TS 37.324 V15.0.0, "3rd Generation Partnership Project; Technical Specification Group Radio Access Network; E-UTRA and NR; Service Data Adaptation Protocol (SDAP) specification (Release 15)", Jun. 2018.
Samsung,"MAC PDU structure in NR", Agenda Item: 10.3.1.3, 3GPP TSG-RAN WG2 Meeting #97bis, R2-1703574, resubmission of R2-1701904, Spokane, USA, Apr. 3-7, 2017.
Notice of Reasons for Refusal issued by the Japan Patent Office for corresponding Japanese Patent Application No. 2020-512142, dated Nov. 24, 2020, with a full English translation.
CATT, "NR MAC PDU format", Agenda Item: 10.3.1.3, 3GPP TSG-RAN WG2 Meeting #97bis, R2-1703118, Spokane, USA, Apr. 3-7, 2017.
Oppo, "LCP considering multiple numerologies", Agenda Item: 10.3.1.6, 3GPP TSG-RAN WG2 Meeting #98, R2-1704053, Hangzhou, China, May 15-19, 2017.
Samsung, "NR MAC header fields", Agenda Item: 10.3.1.3, 3GPP TSG-RAN WG2 Meeting #98, R2-1705680, Hangzhou, China, May 15-19, 2017.
ITRI, "Non-Real-Time Segmentation and Concatenation for NR", Agenda Item: 9.2.1.3, 3GPP TSG-RAN WG2 Meeting #95bis, R2-166483, Kaohsiung, Taiwan, Oct. 10-14, 2016.
First Notification of Office Action issued by China National Intellectual Property Administration for corresponding Chinese Application No. 201880080808.1, dated Sep. 2, 2020, with a full machine English translation.
Nokia et al., "MAC sub-header formats", Agenda item: 10.3.1.3., 3GPP TSG-RAN WG2 #99, R2-1708763, Berlin, Germany, Aug. 21-25, 2017.
Interdigital Inc., "Summary of [99b#40] [NR UP/MAC] LCP", Agenda item: 10.3.1.7., 3GPP TSG-RAN WG2 #100, R2-1712786, Reno, USA, Nov. 27-Dec. 1, 2017.
Extended European search report with supplementary European search report and the European search opinion issued by the European Patent Office for corresponding European Patent Application No. EP 18 91 3294.7-1212, dated Feb. 19, 2021.
FUJITSU, "MAC header shortening", Agenda Item: 10.3.1.11 (Impact of PDCP duplication on MAC), 3GPP TSG-RAN WG2 Meeting #101, R2-1802548, Athens, Greece, Feb. 26-Mar. 2, 2018.
FUJITSU, "RLC header shortening", Agenda Item: 10.3.2.3 (Impact of PDCP duplication to RLC), 3GPP TSG-RAN WG2 Meeting #101, R2-1802549, Athens, Greece, Feb. 26-Mar. 2, 2018.
Second Notification of Office Action issued by the China National Intellectual Property Administration for corresponding Chinese Patent Application No. 201880080808.1, dated Jan. 29, 2021, with an English translation.
Notice of Reasons for Refusal issued by the Japanese Patent office for corresponding Japanese Patent Application No. 2020-512142, dated Apr. 13, 2021, with English translation.

\* cited by examiner

FIG.11A

| R | L1 | L2 | L3 | L4 | L5 | L6 | L7 |
|---|----|----|----|----|----|----|----|

LCMAP PATTERN 2

FIG.11B

| R | L1 | L2 | L3 | L4 | L5 | L6 |
|---|----|----|----|----|----|----|

LCMAP PATTERN 3

FIG.11C

| R | L1 | L2 | L3 | L4 | L5 | L6 | R |
|---|----|----|----|----|----|----|---|

LCMAP PATTERN 4

FIG.14

| R | MID | L1 | L2 | L3 | L4 | L5 | L6 |

LCMAP PATTERN 5

FIG.19A

| Index | LCID values |
|---|---|
| 000000 | CCCH |
| 000001-100000 | Identity of the logical channel |
| 100001-X | Identity of the logical channel for URLLC |
| X-110111 | Reserved |
| 111000 | Duplication Activation/Deactivation |
| 111001 | SCell Activation/Deactivation (4 octet) |
| 111010 | SCell Activation/Deactivation (1 octet) |
| 111011 | Long DRX Command |
| 111100 | DRX Command |
| 111101 | Timing Advance Command |
| 111110 | UE Contention Resolution Identity |
| 111111 | Padding |

FIG.19B

| Index | LCID values |
|---|---|
| 000000 | CCCH |
| 000001-100000 | Identity of the logical channel |
| 100001-X | Identity of the logical channel for URLLC |
| X-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

BASE STATION DEVICE, TERMINAL DEVICE, COMMUNICATION METHOD AND COMMUNICATION SYSTEM

CROSS-REFERENCE TO RELATED APPLICATION

This application is a continuation of U.S. application Ser. No. 16/260,672, filed Jan. 29, 2019, which is a continuation application of International Application PCT/JP2018/014339 filed on Apr. 3, 2018 and designated the U.S., the entire contents of each are incorporated herein by reference.

FIELD

The present invention relates to a base station device, a terminal device, a communication method and a communication system.

BACKGROUND

In current networks, mobile terminal (smartphone or future phone) traffic occupies the majority of network resources. Furthermore, the traffic used by mobile terminals will tend to increase in the future.

On the other hand, with the development of IoT (Internet of Things) services (for example, communication systems, smart meters, monitoring system for devices, etc.), there is a demand for compatibility with services having various different requirements. Therefore, in the communication standards for fifth-generation mobile communications (5G or NR (New Radio)), there is a demand for technology that achieves faster data rates, greater capacity and lower latency, in addition to the standard technology for 4G (fourth-generation mobile communications). 3GPP working groups (for example, TSG-RAN WG1, TSG-RAN WG2, etc.) are advancing with technical investigation into fifth-generation communication standards.

In order to deal with various services of different types, it is envisaged that 5G will support a large number of use case which are categorized into eMBB (Enhanced Mobile Broad-Band), Massive MTC (Machine Type Communications) and URLLC (Ultra-Reliable and Low Latency Communication). URLLC, in particular, is one use case that is difficult to achieve due to the two requirements of ultra-high reliability and low latency.

Furthermore, in 5G, ultra-reliable low-latency communication data (URLLC data) and other data (for example, eMBB data, etc.) need to be supported simultaneously by the same carrier, and it is desirable if the frequency usage efficiency is not impaired in order to achieve this.

5G technologies are described in the following prior art literature.

CITATION LIST

Non-Patent Literature

Non-patent Literature 1: 3GPP TS 36.211 V15.0.0 (2017-12)
Non-patent Literature 2: 3GPP TS 36.212 V15.0.1 (2018-01)
Non-patent Literature 3: 3GPP TS 36.213 V15.0.0 (2017-12)
Non-patent Literature 4: 3GPP TS 36.300 V15.0.0 (2017-12)
Non-patent Literature 5: 3GPP TS 36.321 V15.0.0 (2017-12)
Non-patent Literature 6: 3GPP TS 36.322 V15.0.0 (2017-12)
Non-patent Literature 7: 3GPP TS 36.323 V14.5.0 (2017-12)
Non-patent Literature 8: 3GPP TS 36.331 V15.0.1 (2018-01)
Non-patent Literature 9: 3GPP TS 36.413 V15.0.0 (2017-12)
Non-patent Literature 10: 3GPP TS 36.423 V15.0.0 (2017-12)
Non-patent Literature 11: 3GPP TS 36.425 V14.0.0 (2017-03)
Non-patent Literature 12: 3GPP TS 37.340 V15.0.0 (2017-12)
Non-patent Literature 13: 3GPP TS 38.201 V15.0.0 (2017-12)
Non-patent Literature 14: 3GPP TS 38.202 V15.0.0 (2017-12)
Non-patent Literature 15: 3GPP TS 38.211 V15.0.0 (2017-12)
Non-patent Literature 16: 3GPP TS 38.212 V15.0.0 (2017-12)
Non-patent Literature 17: 3GPP TS 38.213 V15.0.0 (2017-12)
Non-patent Literature 18: 3GPP TS 38.214 V15.0.0 (2017-12)
Non-patent Literature 19: 3GPP TS 38.215 V15.0.0 (2017-12)
Non-patent Literature 20: 3GPP TS 38.300 V15.0.0 (2017-12)
Non-patent Literature 21: 3GPP TS 38.321 V15.0.0 (2017-12)
Non-patent Literature 22: 3GPP TS 38.322 V15.0.0 (2017-12)
Non-patent Literature 23: 3GPP TS 38.323 V15.0.0 (2017-12)
Non-patent Literature 24: 3GPP TS 38.331 V15.0.0 (2017-12)
Non-patent Literature 25: 3GPP TS 38.401 V15.0.0 (2017-12)
Non-patent Literature 26: 3GPP TS 38.410 V 0.6.0 (2017-12)
Non-patent Literature 27: 3GPP TS 38.413 V0.5.0(2017-12)
Non-patent Literature 28: 3GPP TS 38.420 V0.5.0(2017-12)
Non-patent Literature 29: 3GPP TS 38.423 V0.5.0(2017-12)
Non-patent Literature 30: 3GPP TS 38.470 V15.0.0 (2018-01)
Non-patent Literature 31: 3GPP TS 38.473 V15.0.0 (2017-12)
Non-patent Literature 32: 3GPP TR 38.801 V14.0.0(2017-03)
Non-patent Literature 33: 3GPP TR 38.802 V14.2.0(2017-09)
Non-patent Literature 34: 3GPP TR 38.803 V14.2.0(2017-09)
Non-patent Literature 35: 3GPP TR 38.804 V14.0.0 (2017-03)
Non-patent Literature 36: 3GPP TR 38.900 V14.3.1 (2017-07)
Non-patent Literature 37: 3GPP TR 38.912 V14.1.0 (2017-06)
Non-patent Literature 38: 3GPP TR 38.913 V14.3.0 (2017-06)
Non-patent Literature 39: "New SID Proposal: Study on New Radio Access Technology", NTT docomo, RP-160671, 3GPP TSG RAN Meeting #71, Goteborg, Sweden, 7-10 Mar. 2016

Non-patent Literature 40: "On co-existence of eMBB and URLLC", NTT docomo, R1-167391, 3GPP TSG RAN WG1 Meeting #86, Gothenburg, Sweden 22-26 Aug. 2016

SUMMARY

A base station device includes a transmitter configured to transmit for each logical channel first data of a first type and second data of a second type, and processor circuitry configured to, be able to omit information about a data length of the second data in a MAC protocol data unit (PDU), place a medium access control (MAC) header in front of a MAC service data unit (MSDU) of the second data, and multiplex the first data and the second data.

One aspect of the invention is able to reduce the overhead due to the transmission of a header part.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11A, FIG. 11B and FIG. 11C are a set of diagrams figure examples of patterns where an R bit is set in a portion of LCMAP.

FIG. 14 is a diagram figure an example of an LCMAP pattern 5.

FIG. 19A and FIG. 19B are a set of diagrams figure the LCID numbers and the corresponding data types.

DESCRIPTION OF EMBODIMENTS

Embodiments of the invention are described in detail below with reference to the drawings. The problems and embodiments in the present description are examples and do not limit the scope of the rights of the present application. In particular, the technology of the present application can be applied to configurations which are expressed differently but are technically equivalent, and the scope of rights is not to be limited by differences in expression.

First Embodiment

Initially, a first embodiment will be described.

URLLC envisages the transmission of data of small size, for example. However, if the data size is small, then the ratio of the transmission message occupied by the header part becomes large, and the overhead due to the transmission of the header part becomes large. In this case, there are situations where it is not possible to achieve the requirement of the low latency in URLLC.

Figure 1:
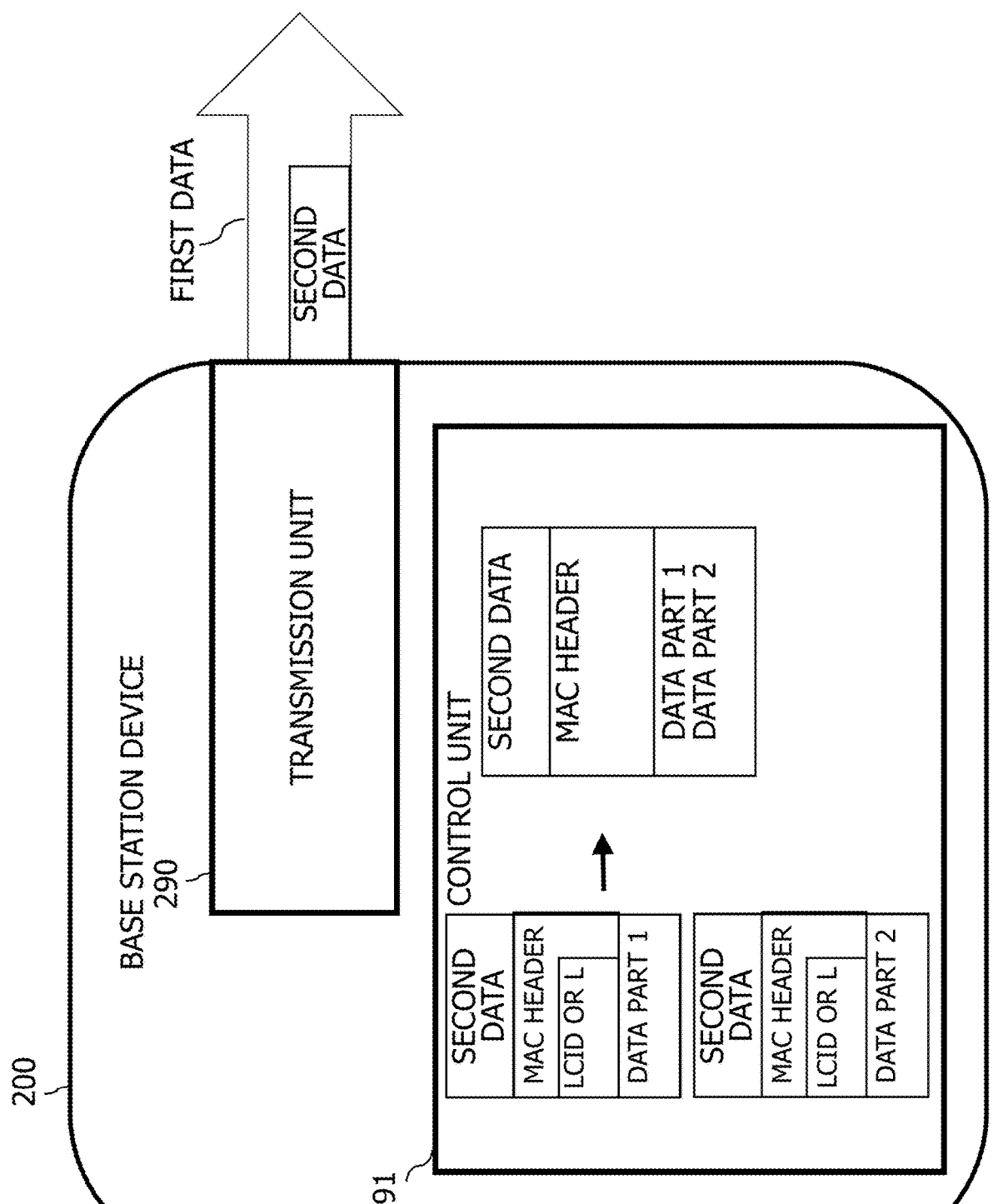
FIG. 1 is a diagram figure an example of a configuration of a communication system 10.

FIG. 1 is a diagram figure an example of a configuration of a communication system 10. The base station device 200 transmits first data and second data to a communication counterpart device (not illustrated).

The base station device 200 has a transmitter 290 and a controller 291. The transmitter 290 and the controller 291 are constructed, for example, by means of a computer or processor of the base station device 200 loading and executing a program.

The base station device 200 is a device which transmits data and is, for example, a gNodeB in 5G. The base station device 200 transmits first data of a first type (for example, eMBB) and second data of a second type (for example, URLLC). The base station device 200 may multiplex the first data and second data and transmit the resulting data.

The transmitter 290 transmits the first data and second data by using a plurality of logical channels. The transmitter 290 multiplexes the first data and second data and transmits the resulting data, if an opportunity for transmitting the second data occurs during the transmission of the first data, for example.

The controller 291 can omit the logical channel number (LCID: Logical Channel Identifier) which is included in the MAC header of the second data, when the transmitter 290 multiplexes the first data and the second data and transmits the resulting data.

Furthermore, the controller 291 can omit the data length (L: Length) which is included in the MAC header of the second data and indicates the size (length) of the data part, when the transmitter 290 multiplexes the first data and the second data and transmits the resulting data.

Consequently, the base station device 200 can suppress the amount of data in the MAC header and reduce the overhead due to the transmission of the header part.

Second Embodiment

Next, a second embodiment will be described.

<Example of Configuration of Communication System>

Figure 2:
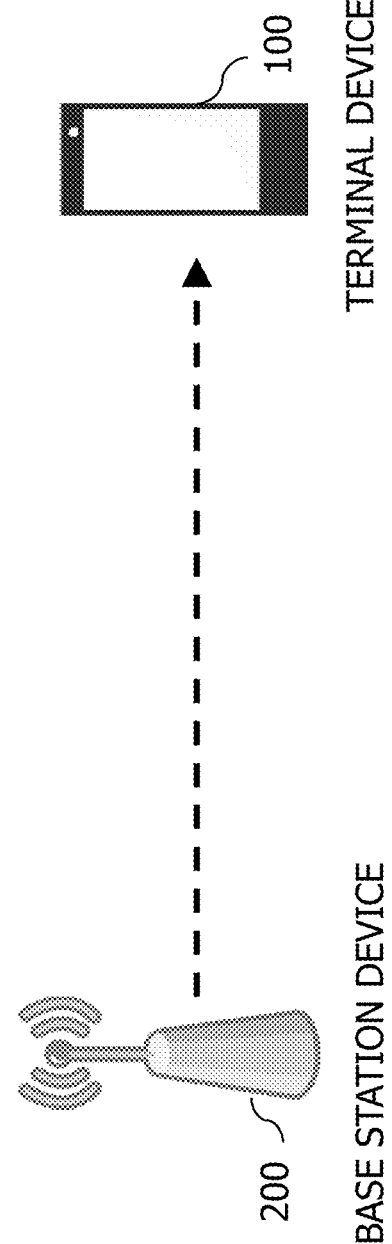
FIG. 2 is a diagram figure an example of the configuration of a communication system 10.

FIG. 2 is a diagram figure an example of the configuration of a communication system 10. The communication system 10 has a terminal device 100 and a base station device 200. The communication system 10 is, for example, a communication system for 5G-compliant wireless communication. Furthermore, the communication system 10 is a communication system compliant with the protocol stack indicated below.

In the communication standards for a wireless communication system, the specifications are generally defined as a protocol stack (also called hierarchical protocols) in which the wireless communication functions are divided into a series of layers. For example, a physical layer is defined as a first layer, a data link layer is defined as a second layer, and a network layer is defined as a third layer. In a fourth-generation mobile communication system, such as LTE, the second layer is divided into a plurality of sub-layers and is constituted by a MAC (Medium Access Control) layer, an RLC (Radio Link Control) layer, and a PDCP (Packet Data Convergence Protocol) layer. Furthermore, in a fourth-generation mobile communication system, the first layer is constituted by a PHY (Physical) layer, and the third layer is constituted by an RRC (Radio Resource Control) layer (the RRC layer is only a control plane).

Each layer in the transmission device of the wireless communication system generates a protocol data unit (PDU), which is an information unit that is exchanged with a peer process in the reception device, by carrying out a process in accordance with a prescribed protocol, such as attaching a header to a data block (also called service data unit (SDU)) from an upper layer, and transfers the PDU to a lower layer. For example, in the RLC layer in LTE, a PDCP-PDU, which is a data block from the PDCP layer, an upper layer, is taken as an RLC-SDU, and an RLC-PDU is generated by connecting a plurality of RLC-SDUs within the range contained by the TB (Transport Block) length reported from the lower layer, etc. The RLC-PDU of this kind is transferred to the MAC layer, which is a lower layer, in a state where an RLC header having a sequence number (SN) in the RLC layer has been attached thereto.

The layers in the reception device of the wireless communication system receive the data block (also called PDU) from the lower layer, and transfer a data block (also called SDU) extracted by removing the header, etc., to the upper layer. For example, in the RLC in LTE, a process for reconstructing a plurality of RLC-SDUs which are stored in one RLC-PDU, for instance, is carried out by referring to the RLC header attached to the data block (also called MAC-SDU, RLC-PDU) from the MAC layer, which is a lower layer, and the RLC-SDU is transferred to the PDCP layer, which is an upper layer. In this case, in order to correct the order of the RLC-SDUs sent to the upper layer, in the reconstruction of the RLC-SDUs, a reordering process is carried out on the basis of the RLC sequence numbers in the RLC header. If a missing RLC sequence numbers has detected, then RLC retransmission control is executed to request retransfer of the RLC-PDU by the transmission device.

The base station device 200, upon receiving data to be transmitted to a terminal device 100 from a network (not illustrated), transmits the data to the terminal device 100 wirelessly. The base station device 200 is, for example, a 5G-compliant gNodeB.

The terminal device 100 is a mobile communication terminal, such as a smartphone or tablet terminal, for example, which communicates with the base station device 200 or with another communication device via the base station device 200.

The base station device 200 uses a portion of the resources for transmitting eMBB, when transmitting URLLC data to the terminal device 100, for example.

Figure 3:
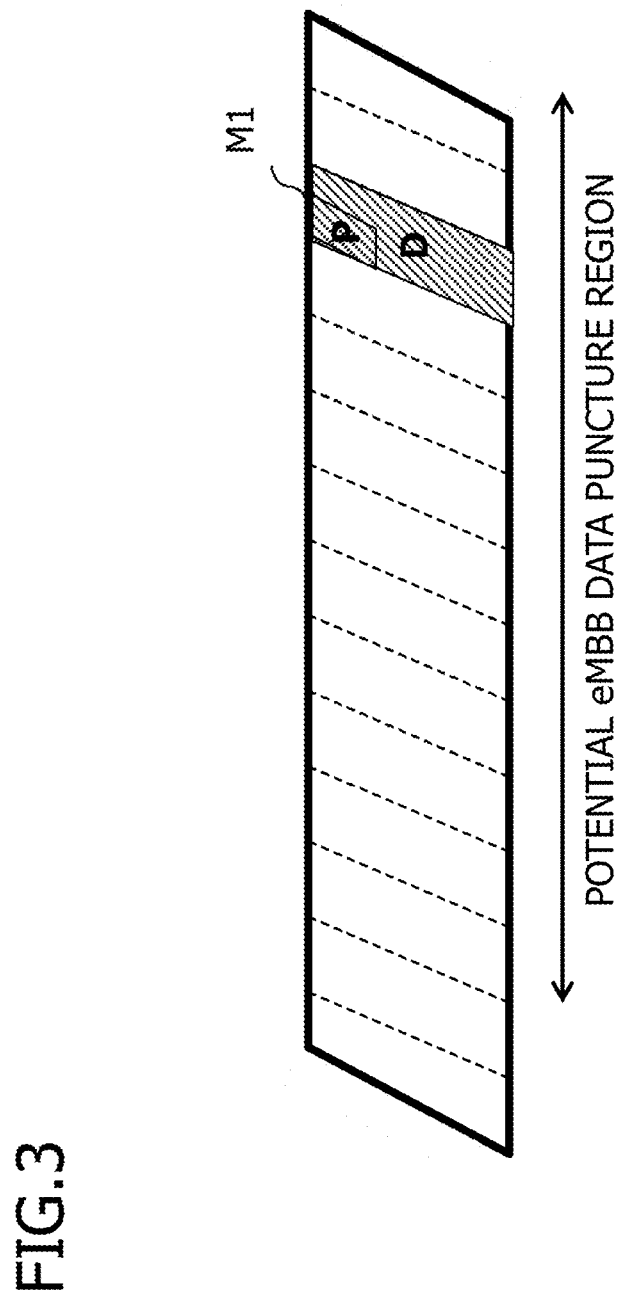
FIG. 3 is a diagram figure an example of interrupt transmission of URLLC in eMBB.

FIG. 3 is a diagram figure an example of interrupt transmission of URLLC in eMBB. The base station device 200 can transmit URLLC by interrupt (puncture) using a potential eMBB data puncture region which is part of the data region that transmits eMBB data. The base station device 200 transmits URLLC data using a message Ml, for example. In the message Ml, "P" indicates "Preemption Indicator". The Preemption Indicator is an identifier for identifying that the data (D in FIG. 3) is not eMBB data, and is, for example, part or all of the message header. The interrupt transmission may use multiple potential eMBB data puncture regions, or a part thereof.

<Example of Configuration of Base Station Device>

Figure 4:
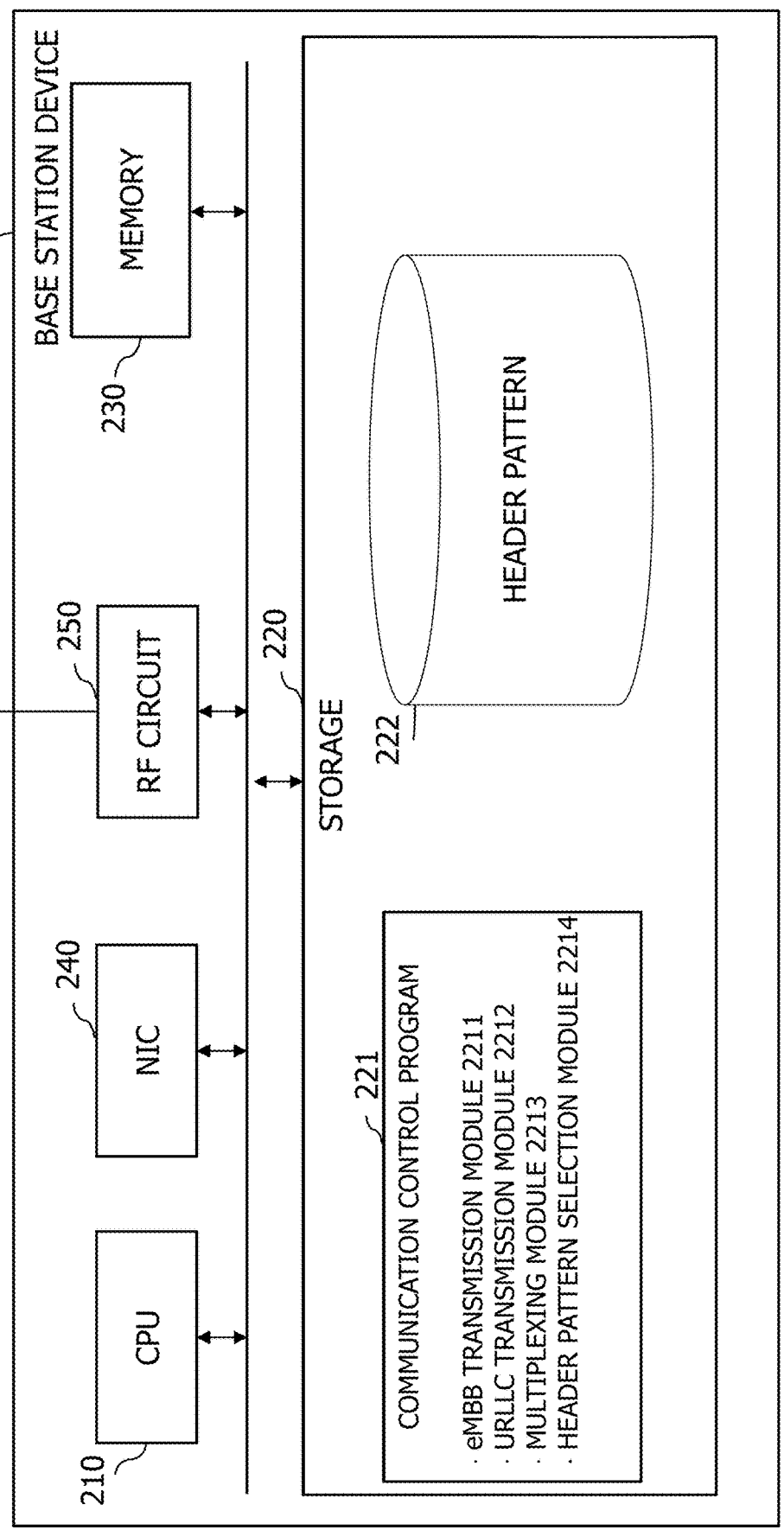
FIG. 4 is a diagram figure an example of the configuration of the base station device 200.

FIG. 4 is a diagram figure an example of the configuration of the base station device 200. The base station device 200 has a CPU (Central Processing Unit) 210, a storage 220, a memory 230 such as a DRAM (Dynamic Random Access Memory) 230, an NIC (Network Interface Card) 240 and an RF (Radio Frequency) circuit 250. The base station device 200 is, for example, a transmission device which transmits URLLC data to the terminal device 100.

The storage 220 is an auxiliary storage device, such as a flash memory, HDD (Hard Disk Drive) or SSD (Solid State Drive), etc., which stores programs and data. The storage 220 stores a communication control program 221 and a header pattern 222.

The header pattern 222 is a region which stores a header pattern that is described below. The header pattern 222 may be incorporated into the program.

The memory 230 is a region to which a program stored in the storage 220 is loaded. Furthermore, the memory 230 is also used as a region where the program stores data.

The NIC 240 is a network interface which connects to a network (not illustrated) such as the Internet or an Intranet. The base station device 200 communicates with a communication device connected to the network, via the NIC 240.

The RF circuit 250 is a device which connects wirelessly with the terminal device 100. The RF circuit 250 has an antenna 251, for example.

The CPU 210 is a processor or computer which performs various processes by loading a program stored in the storage 220, to the memory 230, and executing the loaded program.

The CPU 210 constructs a transmitter and controller, and performs a communication control process, by executing a communication control program 221. The communication control process is a process for performing wireless communication with the terminal device 100. The base station device 200, in the communication control process, transmits data for eMBB (which may be called "eMBB data" hereinafter) and data for URLLC (which may be called "URLLC data" hereinafter) to the terminal device 100. Furthermore, the base station device 200, in the communication control process, multiplexes the eMBB data and URLLC data, selects the header pattern for the URLLC data, and notifies the terminal device 100 of the selected header pattern.

The CPU 210 constructs a transmitter and carries out an eMBB transmission process, by executing an eMBB transmission module 2211 of the communication control program 221. The eMBB transmission process is a process for transmitting eMBB data to the terminal device 100.

The CPU 210 constructs a transmitter and carries out a URLLC transmission process, by executing a URLLC transmission module 2212 of the communication control program 221. The URLLC transmission process is a process for transmitting URLLC data to the terminal device 100.

The CPU 210 constructs a transmitter and carries out a multiplexing process, by executing a multiplexing module 22113 of the communication control program 221. The multiplexing process is a process for multiplexing the eMBB data and the URLLC data. In the multiplexing process, the base station device 200 multiplexes the data by inserting the URLLC data, by interrupt, into a portion of a potential eMBB data puncture region.

The CPU 210 constructs a controller and carries out a header pattern selection process, by executing a header pattern selection module 2214 of the communication control program 221. The header pattern selection process is a process for selecting a header pattern for the URLLC data, for example. The base station device 200 selects a header pattern in accordance with the characteristics of the URLLC data to be transmitted, when multiplexing eMBB data and URLLC data, for example.

<Example of Configuration of Terminal Device>

Figure 5:
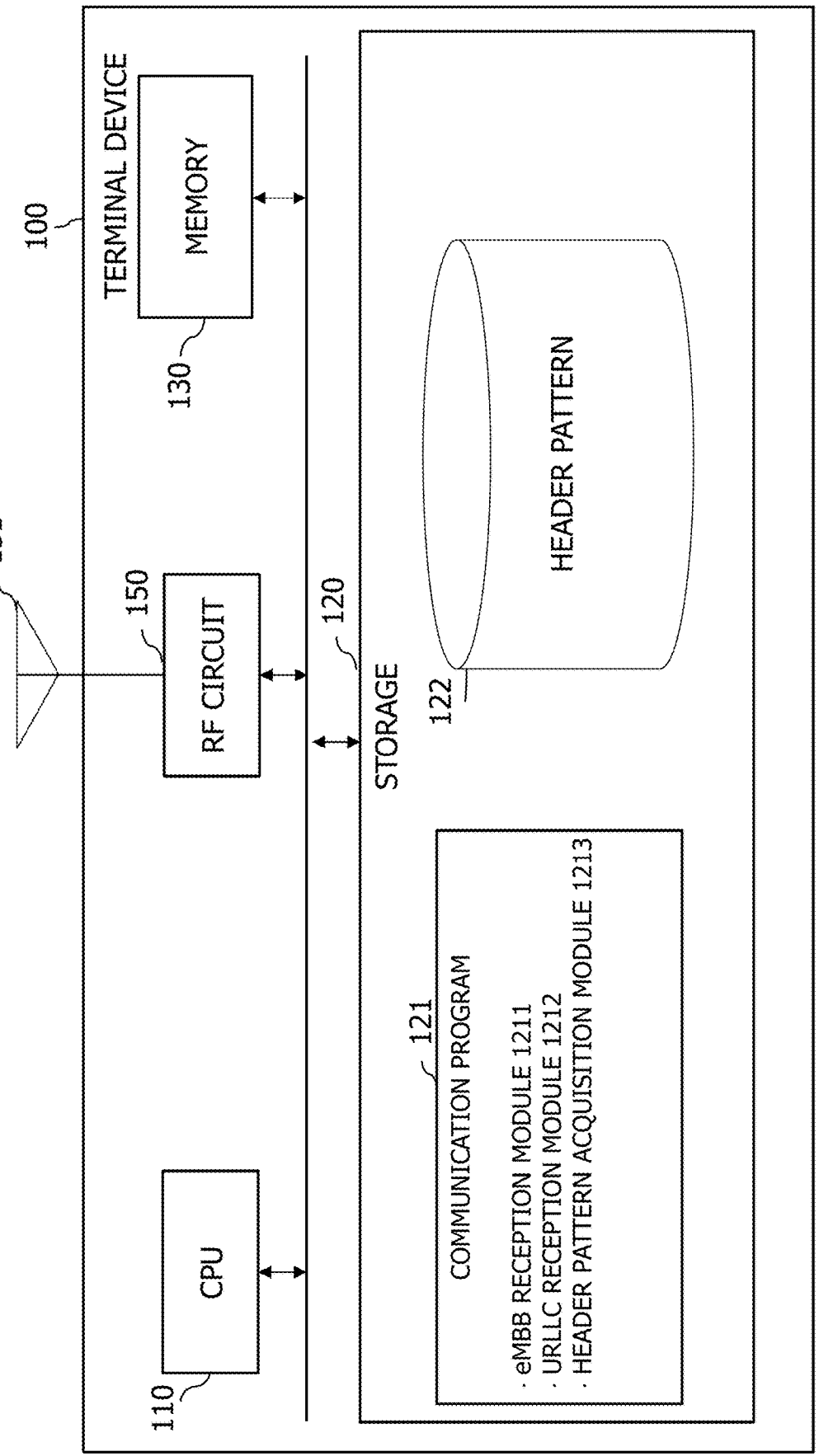
FIG. 5 is a diagram figure an example of the configuration of the terminal device 100.

FIG. 5 is a diagram figure an example of the configuration of the terminal device 100. The terminal device 100 has a CPU 110, a storage 120, a memory 130 such as a DRAM, and an RF circuit 150. The terminal device 100 is, for example, a reception device which receives URLLC data from the base station device 200.

The storage 120 is an auxiliary storage device, such as a flash memory, HDD or SSD which stores programs and data. The storage 120 stores a communication program 121 and a header pattern 122.

The header pattern 122 is a region that stores a header pattern which is described below. The header pattern 122 may be incorporated into the program. Furthermore, the header pattern 122 may be the same as the header pattern 222 of the base station device 200, for example.

The memory 130 is a region where a program stored in the storage 120 is loaded. Furthermore, the memory 130 is a region used by the program to store data.

The RF circuit 150 is a device which is wirelessly connected to the base station device 200. The RF circuit 150 has an antenna 151, for example.

The CPU 110 is a processor or computer which performs various processes by loading a program stored in the storage 120, to the memory 130, and executing the loaded program.

The CPU 110 constructs a receiver and a reception controller and performs a communication process, by executing a communication program 121. The communication process is a process for performing wireless communication with the base station device 200. In the communication process, the terminal device 100 receives eMBB data and URLLC data (including multiplexed data). Furthermore, in the communication process, the terminal device 100 acquires the header pattern of the URLLC data from the base station device 200, when the eMBB data and URLLC data are multiplexed.

The CPU 110 constructs a receiver and carries out an eMBB reception process, by executing an eMBB reception module 1211 of the communication program 121. The eMBB reception process is a process for receiving eMBB data from the base station device 200.

The CPU 110 constructs a receiver and carries out a URLLC reception process, by executing a URLLC reception module 1212 of the communication program 121. The URLLC reception process is a process for receiving URLLC data from the base station device 200.

The CPU 110 constructs a controller and carries out a header pattern acquisition process, by executing a header pattern acquisition module 1213 of the communication program 121. The header pattern acquisition process is a process for acquiring the header pattern selected by the base station device 200. In the header pattern acquisition process, the terminal device 100 acquires the header pattern by receiving the header pattern reported by the base station device 200. The terminal device 100 is able to receive the URLLC data that has been multiplexed with the eMBB data by acquiring the header pattern.

<Data Transmission Process>

Figure 6:
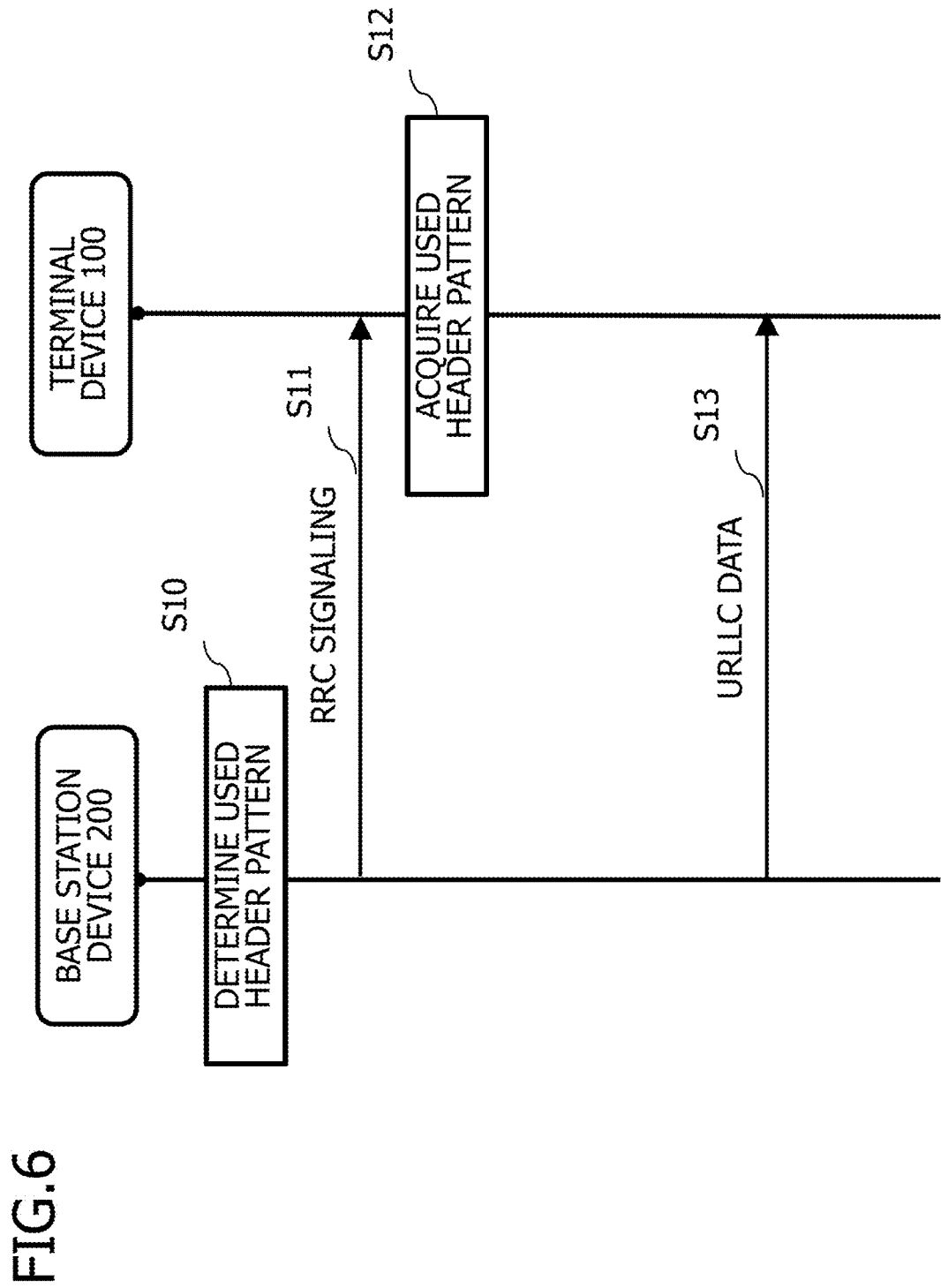
FIG. 6 is a diagram figure an example of a sequence of a data transmission process.

FIG. 6 is a diagram figure an example of a sequence of a data transmission process. The base station device 200 determines the header pattern to be used (called "used header pattern" below), when an opportunity for transmitting data to the terminal device 100 occurs (S10). The base station device 200 determines the used header pattern on the basis of whether or not the data to be transmitted is URLLC, for example. URLLC data is data having a fixed length, for instance. Furthermore, URLLC data is data having a data size smaller than a prescribed value, and a data size smaller than eMBB data.

The base station device 200 transmits the used header pattern that has been determined to the terminal device 100, by using RRC signaling (S11). RRC signaling is, for example, a control signal which includes information for transmitting and receiving RRC messages. The base station device 200 is not limited to using RRC signaling for the transmission of the used header pattern that has been determined, and may also use a message or signal that is received by the terminal device 100.

The terminal device 100 receives the RRC signaling and acquires the used header pattern (S12). Thereafter, the terminal device 100 waits for data transmitted with the used header pattern from the base station device 200.

The base station device 200, after notifying the terminal device 100 of the used header pattern, transmits data to the terminal device 100 using the used header pattern that has been determined.

<Used Header Pattern for MAC Header>

Below, an example of a used header pattern in a MAC header will be described. One line in the format given below indicates one octet. Furthermore, one octet is described below as one byte (8 bits).

<1. MAC Basic Pattern>

The basic pattern is a generic header pattern which is also used for the transmission of data of any type, for example. Below, a MAC header pattern 1, which is a MAC basic pattern, is described.

Figure 7:
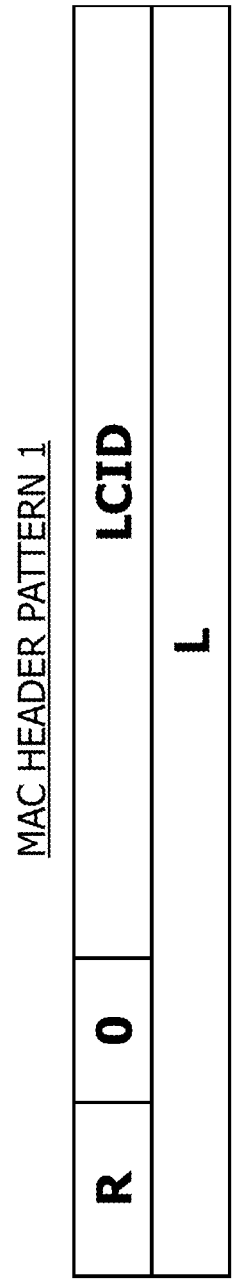
FIG. 7 is a diagram figure an example of a MAC header pattern 1.

FIG. 7 is a diagram figure an example of a MAC header pattern 1. R indicates an R (Reserved) bit. The R bit (reserved bit) is a region reserved to support future extension, for compatibility with future changes in specifications, for example.

LCID is a logical channel identifier. LCID indicates the number of a logical channel which is allocated between the base station device 200 and the terminal device 100, for example. The LCID storage region is 6 bits.

L is the data length (Length). The storage region of L is configured from 8 bits. The storage region of L may also be 16 bits.

In the MAC header pattern 1, the second bit of the first octet to set to 0. 0 is a fixed value.

Figure 8:
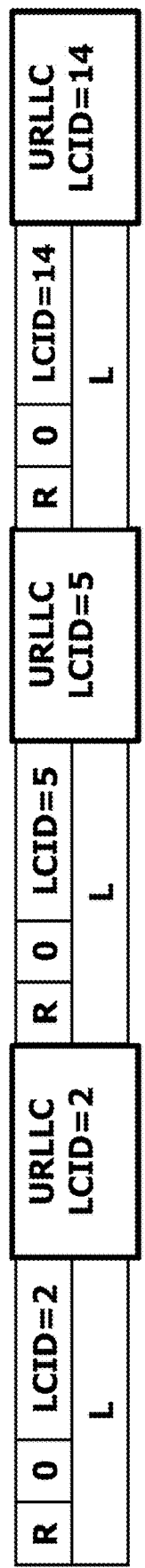
FIG. 8 is a diagram figure an example of a case where URLLC data is transmitted by using the MAC header pattern 1.

FIG. 8 is a diagram figure an example of a case where URLLC data is transmitted by using the MAC header pattern 1. Eight logical channels are set, for instance, and the logical channel numbers are set to 2, 3, 4, 5, 12, 13, 14 and 15. Unless specified otherwise, in the description given below, the number of logical channels and the numbers assigned thereto are taken to be the same as these.

In FIG. 8, the URLLC data (URLLC LCID=x (where x is the logical channel number) in FIG. 8) is attached to the header of the MAC header pattern 1. In FIG. 8, one header is attached to each element of URLLC data. The elements of URLLC data are transmitted by using the logical channel numbers 2, 5 and 14. L is set to the data length of each element of URLLC data.

<2. LCID Mapping>

For example, if there is a small number of logical channels (for example, 8 or fewer), mapping information which maps the logical channels to be used is used instead of the LCID set in the header part of each element of data. Furthermore, the base station device 200 may omit the data length, if the URLLC is of a fixed length.

Figure 9A:
FIG. 9A and FIG. 9B are diagrams figure an example of a MAC header pattern.

FIG. 9A is a diagram figure an example of a MAC header pattern 2. The LCMAP is mapping information which maps the logical channel numbers.

Figure 9B:

FIG. 9B is a diagram figure an example of an LCMAP pattern 1. The LCMAP is mapping information, for example, and is 8 bits with L1 to L8. Lx (where x is an integer) corresponds to each logical channel number. The base station device 200 associates the logical channel numbers used with Lx, in ascending order. For example, the base station device 200 associates L1 with LCID2, L2 with LCID3, L3 with LCID4, L4 with LCID5, L5 with LCID12, L6 with LCID13, L7 with LCID14 and L8 with LCID15. The base station device 200 sets the bit corresponding to the LCID number used, to ON (1). The logical channels used may also be associated with Lx in descending order.

Figure 10:
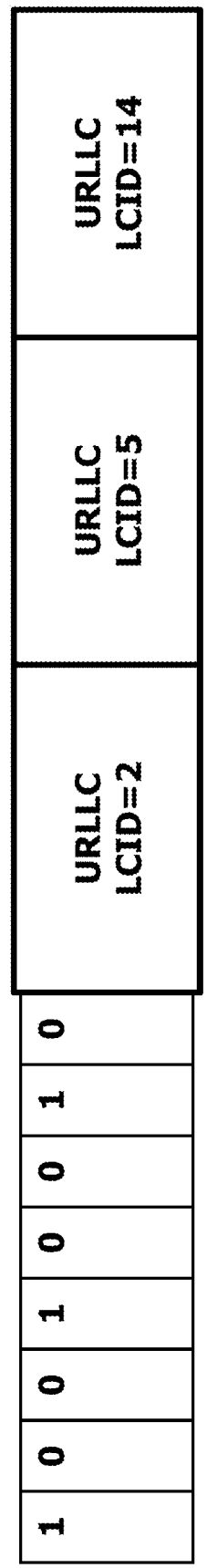
FIG. 10 is a diagram figure an example of a case where URLLC data is transmitted using the MAC header pattern 2.

FIG. 10 is a diagram figure an example of a case where URLLC data is transmitted using the MAC header pattern 2. The data to be transmitted is similar to FIG. 8. In FIG. 10, one 1-octect header and three URLLC data elements are transmitted. In the header, L1, L4 and L7 are 1 (ON). More specifically, FIG. 10 illustrates a case where the URLLC data is transmitted by using LCID2 which corresponds to L1, LCID5 which corresponds to L4, and LCID14 which corresponds to L7.

FIG. 11 is a set of diagrams figure examples of patterns where an R bit is set in a portion of LCMAP. FIG. 11A is a diagram figure an example of an LCMAP pattern 2. The LCMAP pattern 2 is an LCMAP pattern in which an R bit is set at the start of the pattern and L8 is not set. The base station device 200 may use the LCMAP pattern 2, when the number of logical channels used is 7 or less.

FIG. 11B is a diagram figure an example of an LCMAP pattern 3. The LCMAP pattern 3 is an LCMAP pattern in which a plurality of R bits are set. In the LCMAP pattern 3, L7 and L8 are not set. The base station device 200 may use the LCMAP pattern 3, when the number of logical channels used is 6 or less.

FIG. 11C is a diagram figure an example of an LCMAP pattern 4. The LCMAP pattern 4 is an LCMAP pattern in which R bits are set at the start and the end of the pattern, and L7 and L8 are not set. The base station device 200 may use the LCMAP pattern 3 if the number of logical channels used is 6 or less.

FIG. 11 illustrates LCMAP patterns in which one or two R bits are set. However, three of more R bits may be set. Furthermore, the position of the R bit is not limited to the start, end or second bit, as illustrated in FIG. 11, and may be set to any position. The base station device 200 may modify the number of bits set as R bits in accordance with the number of logical channels used.

<2.1 Assignment of Data Length>

The base station device 200 assigns a data length when the URLLC is of variable length. For example, when transmitting N elements of URLLC data (where N is an integer), the base station device 200 assigns N−1 data lengths. This is because the end of the last element of data forms the end of the transport block of the MAC PDC, even if there is no information relating to the data length.

Figure 12:
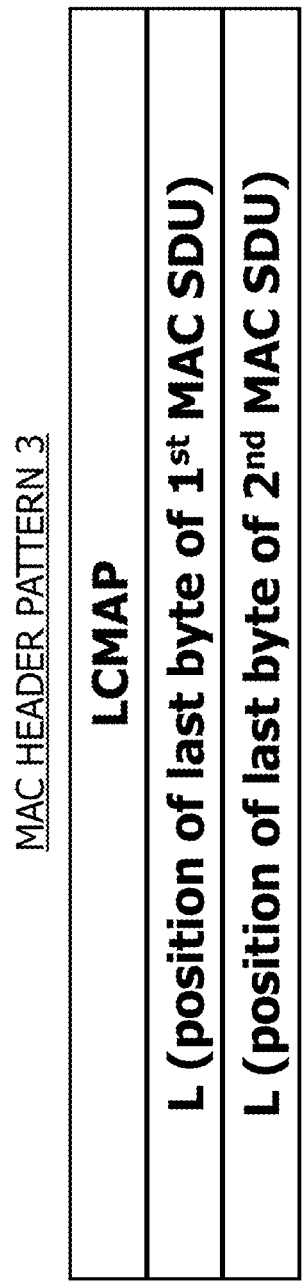
FIG. 12 is a diagram figure an example of a MAC header pattern 3.

FIG. 12 is a diagram figure an example of a MAC header pattern 3. The MAC header pattern 3 has two 1-octet L regions, for example, in addition to LCMAP. The L regions may be the data length of the URLLC data to be transmitted, for example, or may indicate the boundary position (end or start) of the MAC SDU data.

Figure 13:
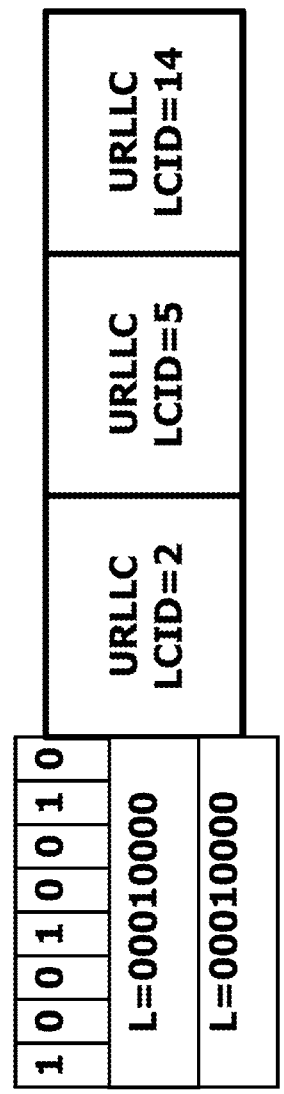
FIG. 13 is a diagram figure an example of a case where URLLC data is transmitted using the MAC header pattern 3.

FIG. 13 is a diagram figure an example of a case where URLLC data is transmitted using the MAC header pattern 3. The data transmitted is similar to that in FIG. 8. In FIG. 13, the base station device 200 transmits one 1-octect header and three elements of URLLC data. In the LCMAP of the header, L1, L4 and L7 are 1 (ON), which corresponds to the LCMAP pattern 1. In other words, FIG. 13 illustrates a case where the URLLC data is transmitted using LCID2 which corresponds to L1, LCID5 which corresponds to L4 and LCID14 which corresponds to L7. Furthermore, the data lengths included in the header are L=00010000, which indicates 32 bytes. In other words, the data length of the URLLC data transmitted by LCID2 and the data length of the URLLC data transmitted by LCID5 respectively indicate 32 bytes. The end of the URLLC data transmitted by LCID14 is the end of the MAC PDC transport block.

In FIG. 12 and FIG. 13, two L regions are set, but three or more L regions may be set. Furthermore, it is also possible to set N L regions, rather than N−1 L regions.

<2.2 Identifier of Header Pattern>

The base station device 200 may assign an identifier which indicates the header pattern to be used. For example, the base station device 200 provides a bit which identifies a header pattern in which the LCID to be used is set directly (for example, the MAC header pattern 1 in FIG. 7) and a header pattern in which mapped information elements are set instead of the LCID.

Figure 14:
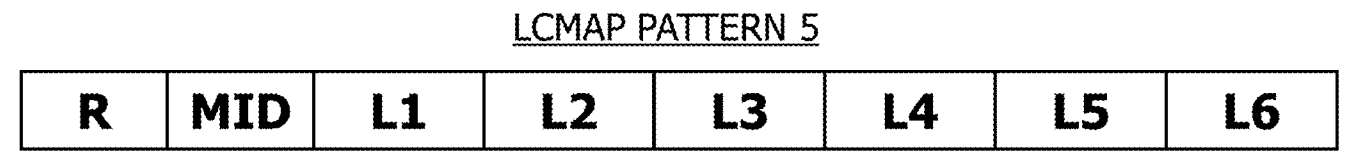

FIG. 14 is a diagram figure an example of an LCMAP pattern 5. The second bit of the LCMAP pattern 5 is a MID bit. The MID bit is a bit that indicates whether or not mapped information elements are used, and is used as a header identifier that identifies the pattern of the header. In the MAC header pattern 1 in FIG. 7, for example, the second bit of the first octet of the MAC header is set to a fixed value of 0. If the second bit (MID bit) of the first octet of the MAC header is 1, then the terminal device 100 recognizes that mapped information elements are used in the header, instead of LCID. In other words, the MID bit of the LCMAP pattern 5 is set to 1.

FIG. 15 is a set of diagrams figure examples of a case where URLLC data is transmitted by using the LCMAP pattern 5 in the MAC header pattern 2. The base station device 200 transmits one element of URLLC data by using LCID2.

Figure 15A:
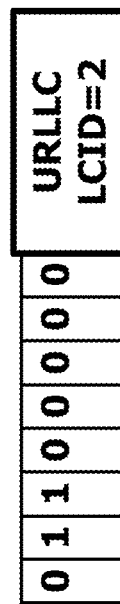
FIG. 15A and FIG. 15B are a set of diagrams figure examples of a case where URLLC data is transmitted by using the LCMAP pattern 5 in the MAC header pattern 2.

FIG. 15A is a diagram figure an example of a case where URLLC data is transmitted by using the LCMAP pattern 5, in the MAC header pattern 2. In FIG. 15A, the MID bit, which is the second bit of the LCMAP in the header, is set to 1. Therefore, the terminal device 100 recognizes that the URLLC data has been transmitted by using the LCMAP pattern 5. L1 in the LCMAP is ON, which indicates that the URLLC data is transmitted using LCID2.

Figure 15B:

FIG. 15B is a diagram figure an example of a pattern in which the MAC header is omitted. If there is one logical channel used by the base station device 200, then the MAC header may be omitted.

Figure 16:
FIG. 16 is a diagram figure an example of a case where URLLC data is transmitted using the LCMAP pattern 5 in the MAC header pattern 2.

FIG. 16 is a diagram figure an example of a case where URLLC data is transmitted using the LCMAP pattern 5 in the MAC header pattern 2. The base station device 200 transmits two elements of URLLC data using LCID2 and LCID5. The MID bit in the second bit of the LCMAP in the header is set to 1. Therefore, the terminal device 100 recognizes that the URLLC data has been transmitted using the LCMAP pattern 5. L1 and L4 in the LCMAP are ON, which indicates that the URLLC data is transmitted using LCID2 and LCID5, respectively.

The MID bit may also identify user data or control data, for example.

By setting the identifier of the header pattern, it is possible to transmit data by using the MAC CE (control element) which is a control signal of the MAC layer, for example. The base station device 200, by setting the second bit of the first octet of the MAC header in the MAC CE to ON (1), can enable the terminal device 100 to recognize that data is being transmitted using the resources of the MAC CE.

<2.3 Omission of Data Length>

The base station device 200 may omit the data length if the URLLC is of a fixed length.

Figure 17:
FIG. 17 is a diagram figure an example of a MAC header pattern 4.

FIG. 17 is a diagram figure an example of a MAC header pattern 4. The MAC header pattern 4 is a pattern that omits the data length from the MAC header pattern 1. Furthermore, an R bit is set in the second bit of the first octet.

Figure 18:
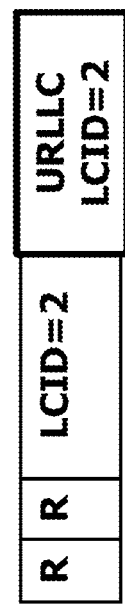
FIG. 18 is a diagram figure an example of a case where URLLC data is transmitted using a MAC header pattern 4.

FIG. 18 is a diagram figure an example of a case where URLLC data is transmitted using a MAC header pattern 4. The base station device 200 sets LCID2 in the LCID region of the header, and transmits the URLLC data using LCID2.

Other Embodiments

In the communication system 10, it is also possible to define the LCID which uses the header described above, for example.

FIG. 19 is a set of diagrams figure the LCID numbers and the corresponding data types. FIGS. 19A and 19B respectively illustrate examples of downlink and uplink definitions.

In FIG. 19A, the LCID numbers (Index) from 10001 to x (where x is a numerical value less than 110111) are defined as the LCID for URLLC (Identity of the logical channel for URLLC). Similarly, in FIG. 19B, the LCID numbers (Index) from 10001 to x (where x is a numerical value less than 110110) are defined as the LCID for URLLC. Accordingly, the base station device 200 can omit all or a part of the header.

Furthermore, there may be cases where the URLLC does not perform multiplexing (concatenation) in the MAC layer. In the communication system 10, an information element indicating the presence or absence of concatenation in the MAC layer may be added, for example.

Moreover, the various embodiments may be combined respectively. For example, in each of the embodiments, it is possible to omit the data length and/or to set an R bit.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station device comprising:
a transmitter configured to transmit, for each logical channel, first data of a first type and second data of a second type; and
processor circuitry configured to:
omit information about a data length of the second data in a MAC protocol data unit (PDU),
place a medium access control (MAC) header in front of a MAC service data unit (MSDU) of the second data, and
multiplex the first data and the second data, wherein the data length of the second data is omitted from the MAC header and an R bit (reserved bit) is set in the first bit of the first octet in the MAC header.

2. The base station device of claim 1, further the R bit (reserved bit) is set in the second bit of the first octet in the MAC header.

3. The base station device of claim 1, wherein when assigning a MAC header in which a logical channel identifier is omitted, the processor circuitry assigns, to the MAC header, mapping information having a plurality of bits corresponding respectively to a plurality of logical channels.

4. The base station device of claim 1, wherein the processor circuitry sets a bit corresponding to a logical channel identifier for transmitting the second data, among a plurality of bits.

5. The base station device of claim 1, wherein the data length of the second data is fixed.

6. The base station device of claim 1, wherein the second type includes Ultra-Reliable and Low-Latency Communication (URLLC).

7. The base station device of claim 1, wherein the first type includes Enhanced Mobile BroadBand (eMBB).

8. The base station device of claim 1, wherein the second data has a data size less than a data size of the first data.

9. A terminal device, comprising:
a receiver configured to receive, for each logical channel, first data of a first type and second data of a second type; and
processor circuitry configured to process a data according to a medium access control (MAC) header placed in front of the second data,
wherein a medium access control (MAC) header is placed in front of a MAC service data unit (MSDU) of the second data,
wherein the first data and the second data is multiplexed, and
wherein a data length of the second data is omitted from the MAC header and an R bit (reserved bit) is set in the first bit of the first octet in the MAC header.

10. The terminal device of claim 9, further the R bit (reserved bit) is set in the second bit of the first octet in the MAC header.

11. A wireless communication method comprising:
transmitting, for each logical channel, first data of a first type and second data of a second type,
omitting information about a data length of the second data in a MAC protocol data unit (PDU)
placing a medium access control (MAC) header in front of a MAC service data unit (MSDU) of the second data,
multiplexing the first data and the second data, wherein the data length of the second data is omitted from the MAC header and an R bit (reserved bit) is set in the first bit of the first octet in the MAC header.

12. A wireless communication method comprising:
receiving, for each logical channel, first data of a first type and second data of a second type, processing a data according to a medium access control (MAC) header placed in front of the second data, wherein a medium access control (MAC) header is placed in front of a MAC service data unit (MSDU) of the second data, wherein the first data and the second data is multiplexed, and wherein a data length of the second data is omitted from the MAC header and an R bit (reserved bit) is set in the first bit of the first octet in the MAC header.

13. The wireless communication method of claim 12, further the R bit (reserved bit) is set in the second bit of the first octet in the MAC header.

\* \* \* \* \*